(12) United States Patent
Jiang et al.

(10) Patent No.: US 7,986,517 B2
(45) Date of Patent: Jul. 26, 2011

(54) NOTEBOOK COMPUTER

(75) Inventors: Hua Jiang, Shenzhen (CN); Zhan-Sheng Lu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 202 days.

(21) Appl. No.: 12/494,316

(22) Filed: Jun. 30, 2009

(65) Prior Publication Data

US 2010/0124009 A1   May 20, 2010

(30) Foreign Application Priority Data

Nov. 19, 2008   (CN) .......................... 2008 1 0305632

(51) Int. Cl.
*G06F 1/16* (2006.01)
(52) U.S. Cl. ................................. 361/679.27
(58) Field of Classification Search ............. 361/679.27; 248/460
See application file for complete search history.

(56) References Cited

U.S. PATENT DOCUMENTS

| | | | | |
|---|---|---|---|---|
| 4,859,092 A * | 8/1989 | Makita | ............................ | 400/83 |
| 5,255,214 A * | 10/1993 | Ma | ............................ | 361/679.06 |
| 5,559,670 A * | 9/1996 | Flint et al. | ................. | 361/679.06 |
| 6,005,767 A * | 12/1999 | Ku et al. | .................. | 361/679.27 |
| 6,464,195 B1 * | 10/2002 | Hildebrandt | .................. | 248/460 |
| 6,532,147 B1 * | 3/2003 | Christ, Jr. | ................. | 361/679.27 |
| 6,665,175 B1 * | 12/2003 | deBoer et al. | ............ | 361/679.06 |
| 6,826,043 B2 * | 11/2004 | Chang | ...................... | 361/679.27 |
| 7,203,058 B2 * | 4/2007 | Hong | ....................... | 361/679.06 |
| 7,251,128 B2 * | 7/2007 | Williams et al. | ......... | 361/679.55 |
| 7,277,275 B2 * | 10/2007 | Won et al. | ................ | 361/679.27 |
| 7,400,498 B2 * | 7/2008 | Liang et al. | .............. | 361/679.55 |
| 7,549,246 B2 * | 6/2009 | Kuo | ............................... | 40/601 |
| 7,566,033 B2 * | 7/2009 | Schwager et al. | ......... | 248/125.9 |
| 7,787,242 B2 * | 8/2010 | Schwager et al. | ....... | 361/679.28 |
| 7,821,783 B2 * | 10/2010 | Wang et al. | ............. | 361/679.27 |
| 2006/0256512 A1 * | 11/2006 | Esther Kang | ................ | 361/681 |

* cited by examiner

*Primary Examiner* — Lisa Lea-Edmonds
(74) *Attorney, Agent, or Firm* — Frank R. Niranjan

(57) ABSTRACT

A notebook computer includes a main body, two connecting assemblies, and a display. The main body comprises an upper surface and two first joint members disposed on two corners of the upper surface. Each of the connecting assemblies includes an arm, a connecting shaft, and a stop cover. One end of the arm is rotatably connected to a first joint member. The connecting shaft is perpendicularly is connected to the arm, and adjacent to a distal end of the arm from the first joint member. The stop cover is rotatably disposed on the distal end. The display defines a pair of axle holes at one sidewall. The display is disposed between the two arms of the two connecting assemblies, and each connecting shaft of each arm is rotatably inserted in the axle hole.

9 Claims, 5 Drawing Sheets

NOTEBOOK COMPUTER

BACKGROUND

1. Technical Field

The present disclosure relates to notebook computers and, particularly, to angular adjustments of the screen of a notebook computer.

2. Description of Related Art

When using a notebook computer in front of an audience, it is not uncommon for the presenter to show the screen while operating the keyboard simultaneously. Therefore, the presenter needs to repeatedly turn the notebook computer 180 degrees back and forth. This is an inconvenience.

What is needed, therefore, is a notebook computer, which can overcome the above-described problem.

DETAILED DESCRIPTION

Embodiments of a notebook computer will now be described in detail with reference to the drawings.

Figure 1:
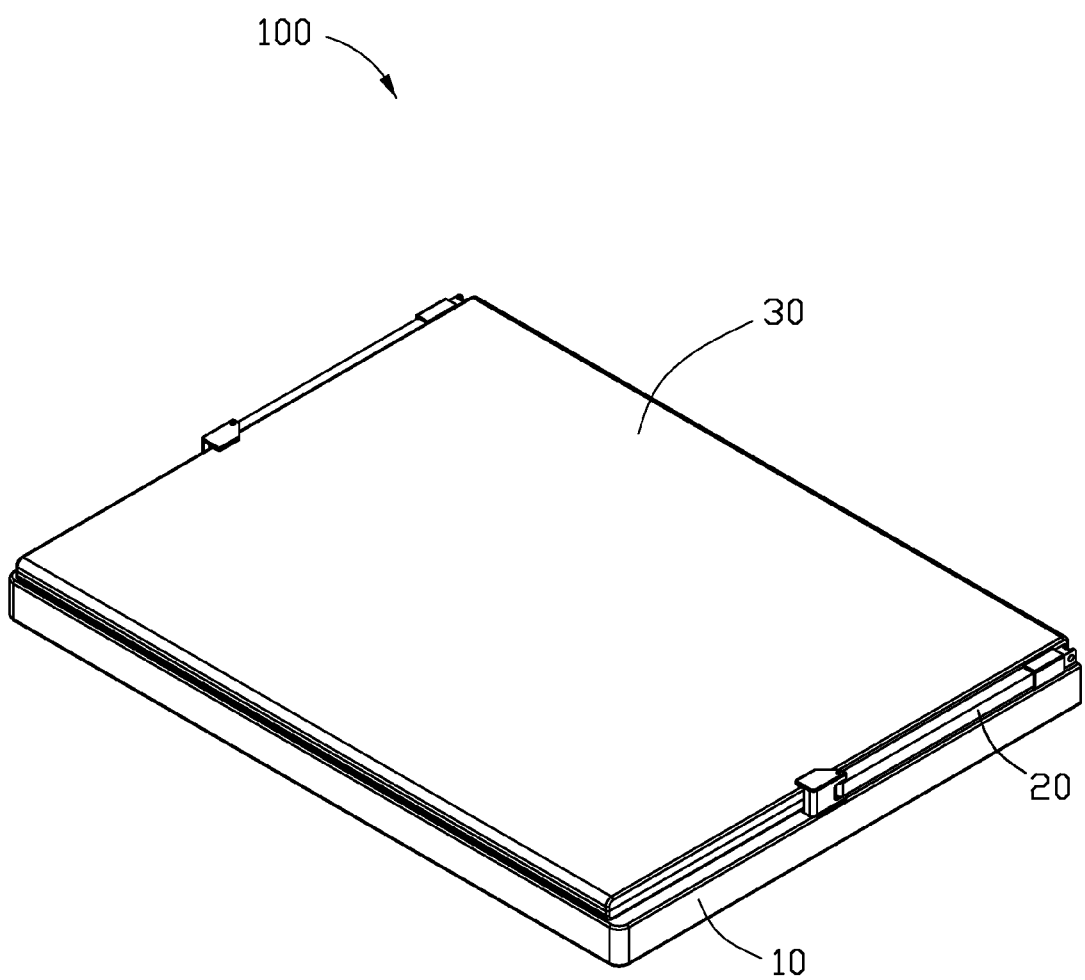
FIG. 1 is an isometric view of a notebook computer of which a display is folded, according to the present disclosure.
Figure 2:
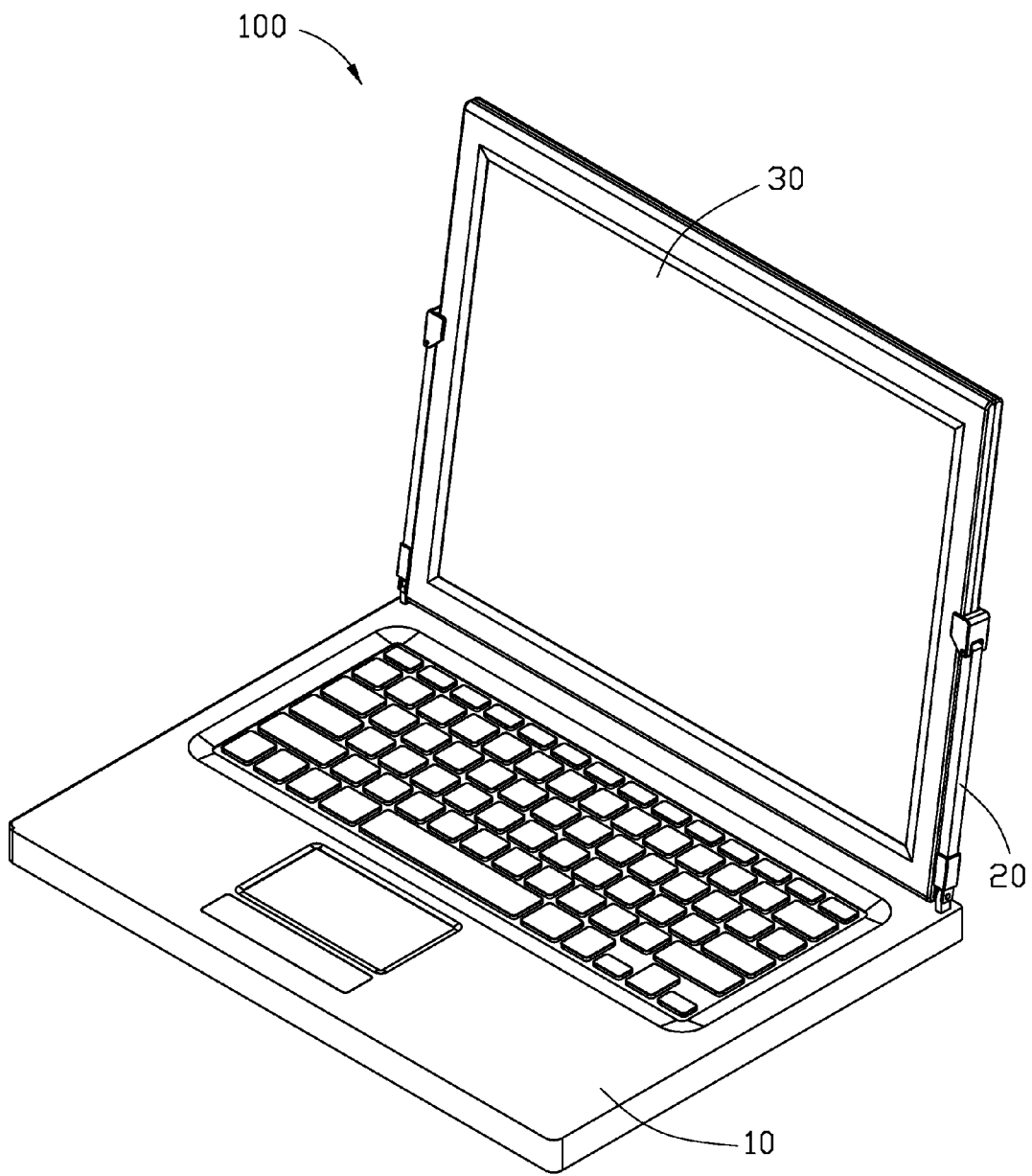
FIG. 2 is an isometric view of the notebook computer of which the display is about 90 degree from the folded position of FIG. 1, according to the present disclosure.
Figure 3:
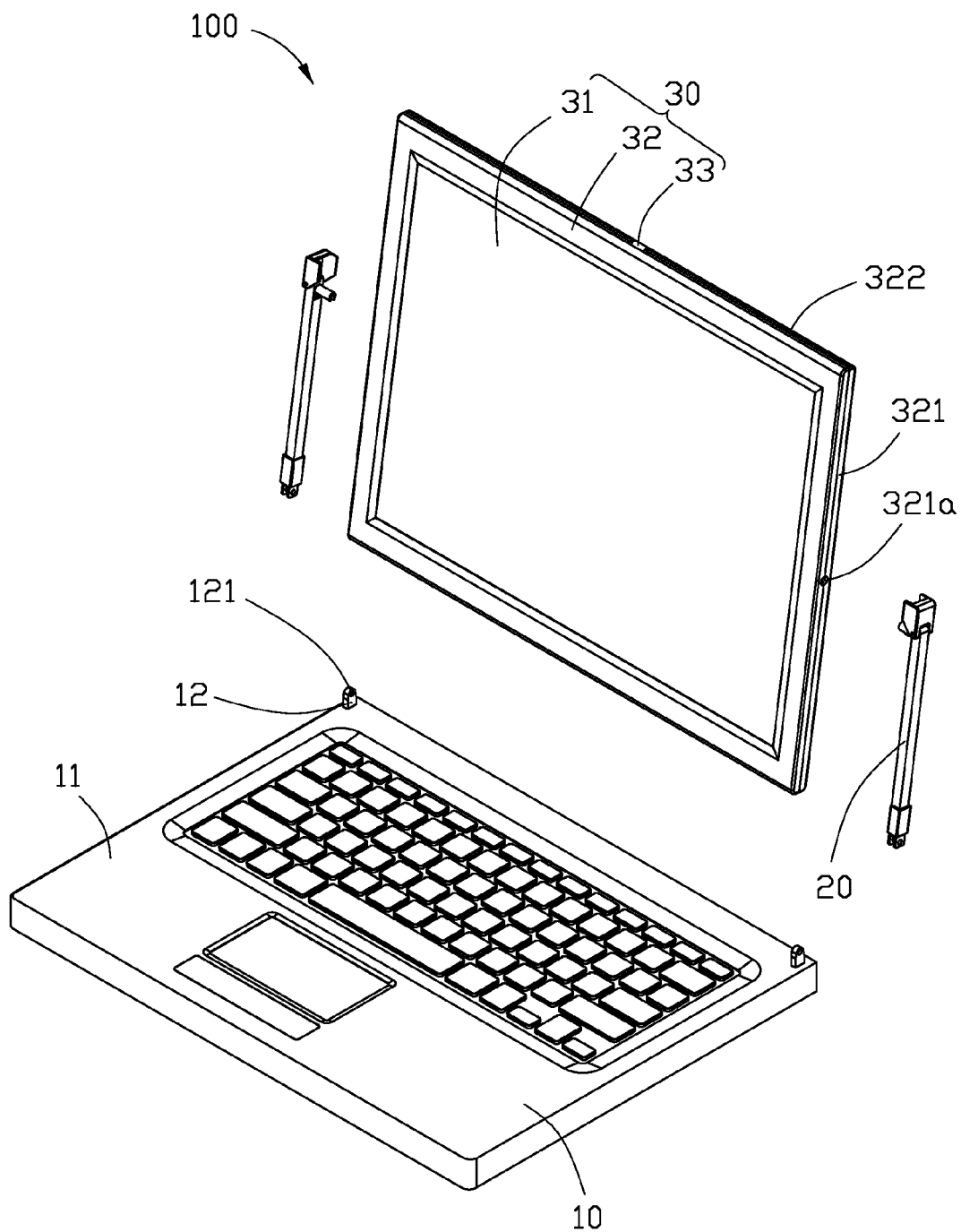
FIG. 3 is an isometric, exploded view of the notebook computer of FIG. 2.

Referring to FIGS. 1-3, a notebook computer 100, according to an exemplary embodiment, includes a main body 10, two connecting assemblies 20, and a display 30.

The main body 10 is cuboid in shape and includes a rectangular upper surface 11 and two first joint members 12. The two first joint members 12 are shafts correspondingly extending upwards from two corners of the rectangular upper surface 11. Each of the first joint members 12 defines a first shaft hole 121. The two first shaft holes 121 are aligned with each other.

Figure 4:
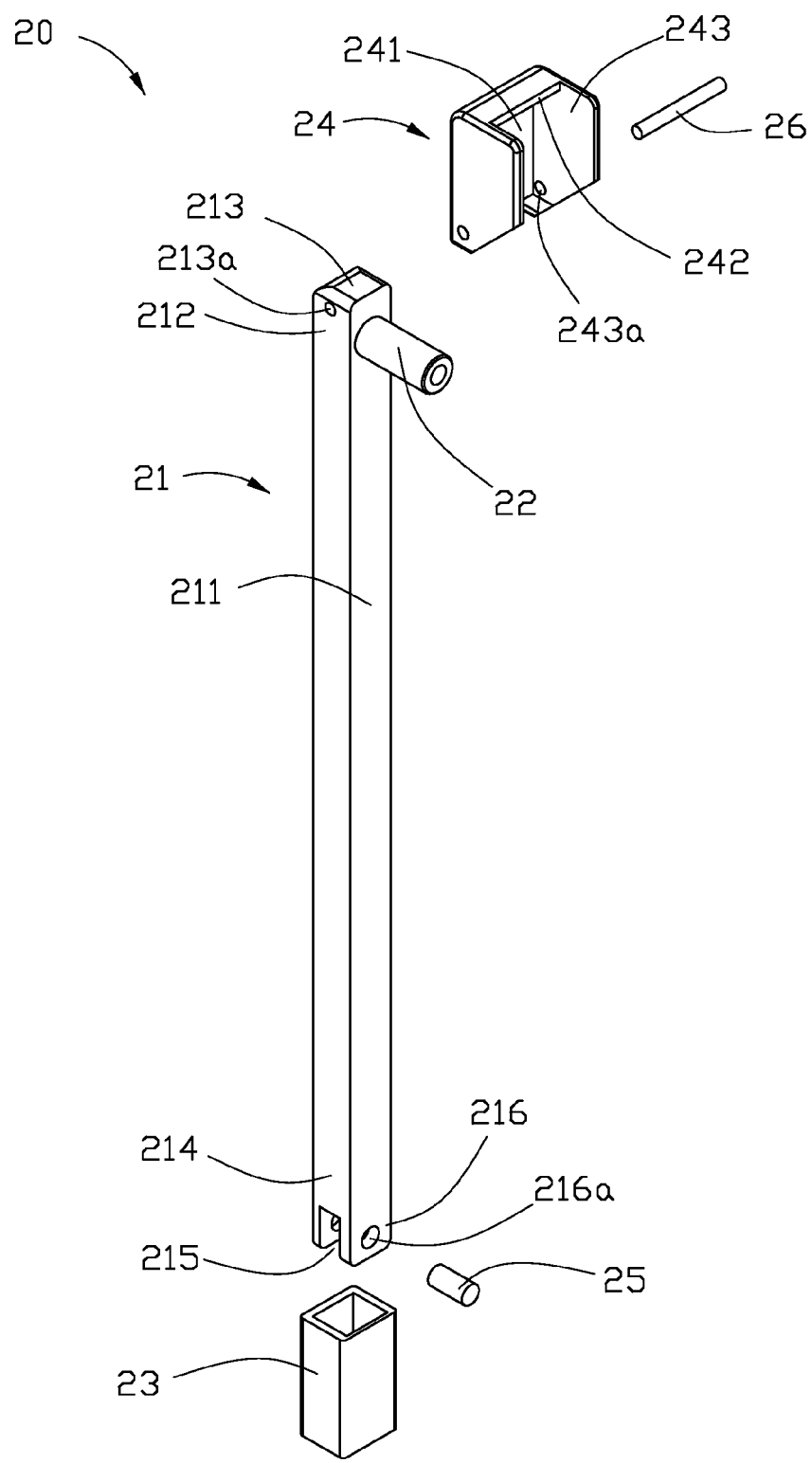
FIG. 4 is an isometric, exploded view of a connecting assembly of the notebook computer of FIG. 3.

Referring to FIGS. 3-4, each of the connecting assemblies 20 includes an arm 21, a connecting shaft 22, a stop sleeve 23, a stop cover 24, a first shaft 25, and a second shaft 26.

The arm 21 is a hollow rectangular rod in shape and includes a pair of first side surfaces 211 and a pair of second side surfaces 212. The arm 21 defines a second shaft hole 213a through one distal end 213. In particular, the second shaft hole 213a extends through the second side surfaces 212. In addition, the arm 21 defines a receiving slot 215 in the other distal end 214, forming two holding plates 216. Each of the holding plates 216 defines a first sleeve hole 216a. The two first sleeve holes 216a are aligned with each other and extend through the first side surfaces 211.

The connecting shaft 22 is a hollow cylindrical rod. The connecting shaft 22 is made of an anti-abrasive material.

The stop sleeve 23 is shaped and sized corresponding to the arm 21. In particular, the stop sleeve 23 is rectangular in shape and has an inner cross section slightly greater than the cross section of the arm 21.

The stop cover 24 includes a base 241, a spacing plate 242, and two side plates 243. The base 241 is a rectangular plate. The spacing plate 242 extends uprightly from one edge of the base 241. The two side plates 243 extend uprightly from opposite edges of the base 241 correspondingly and both connect to the spacing plate 242. The spacing plate 242 is disposed between the side plates 243. Each of the side plates 243 defines a second sleeve hole 243a in one end away from the spacing plate 242. The two second sleeve holes 243a are aligned with each other.

In assembly of the connecting assemblies 20, the connecting shaft 22 is perpendicularly connected to one of the first side surfaces 211 adjacent to the distal end 213. The stop sleeve 23 moveably sleeves onto the distal end 214 of the arm 21. The second shaft 26 inserts through the second sleeve hole 243a and the second shaft hole 213a. Therefore, the stop cover 24 is rotatably fixed at the distal end 213.

The display 30 such as a liquid crystal display (LCD) is shaped corresponding to the main body 10, and includes a screen 31, a frame 32, and a position sensor 33. The frame 32 surrounds the screen 31. The frame 32 includes a pair of first sidewalls 321 and a pair of second sidewalls 322. The frame 32 defines a pair of axle holes 321a in the first sidewalls 321 correspondingly. The position sensor 33 is mounted at one of second sidewalls 322. The position sensor 33 is configured to detect an orientation of the display 30.

In assembly, each of the first shafts 25 inserts through a corresponding first sleeve hole 216a and a corresponding first shaft hole 121. Thereby, the pair of arms 21 is rotatably connected to the main body 10. The connecting shafts 22 are inserted into the axle holes 321a correspondingly. Thereby, the display 30 is rotatably connected to the arms 21. It should be mentioned that a friction force between the connecting shaft 22 and the axle hole 321a is strong enough to hold the display 30 in any desired angles.

In addition, the main body 10 and the display 30 are connected via two cables (not shown). The cables thread through the arm 21 and the connecting shaft 22.

Referring back to the FIG. 1, when not used, the display 30 is folded. Referring back to FIG. 2, in normal use, the display 30 can be about 90 degrees unfolded corresponding to the main body 10. After the display 30 is unfolded to a desired position, the stop sleeves 23 can be pushed to sleeve both the first joint members 12 and the arms 21, thereby fixing the display 30 at the position. In any condition, the stop cover 24 holds the display 30, therefore the display 30 will not swing freely.

Figure 5:
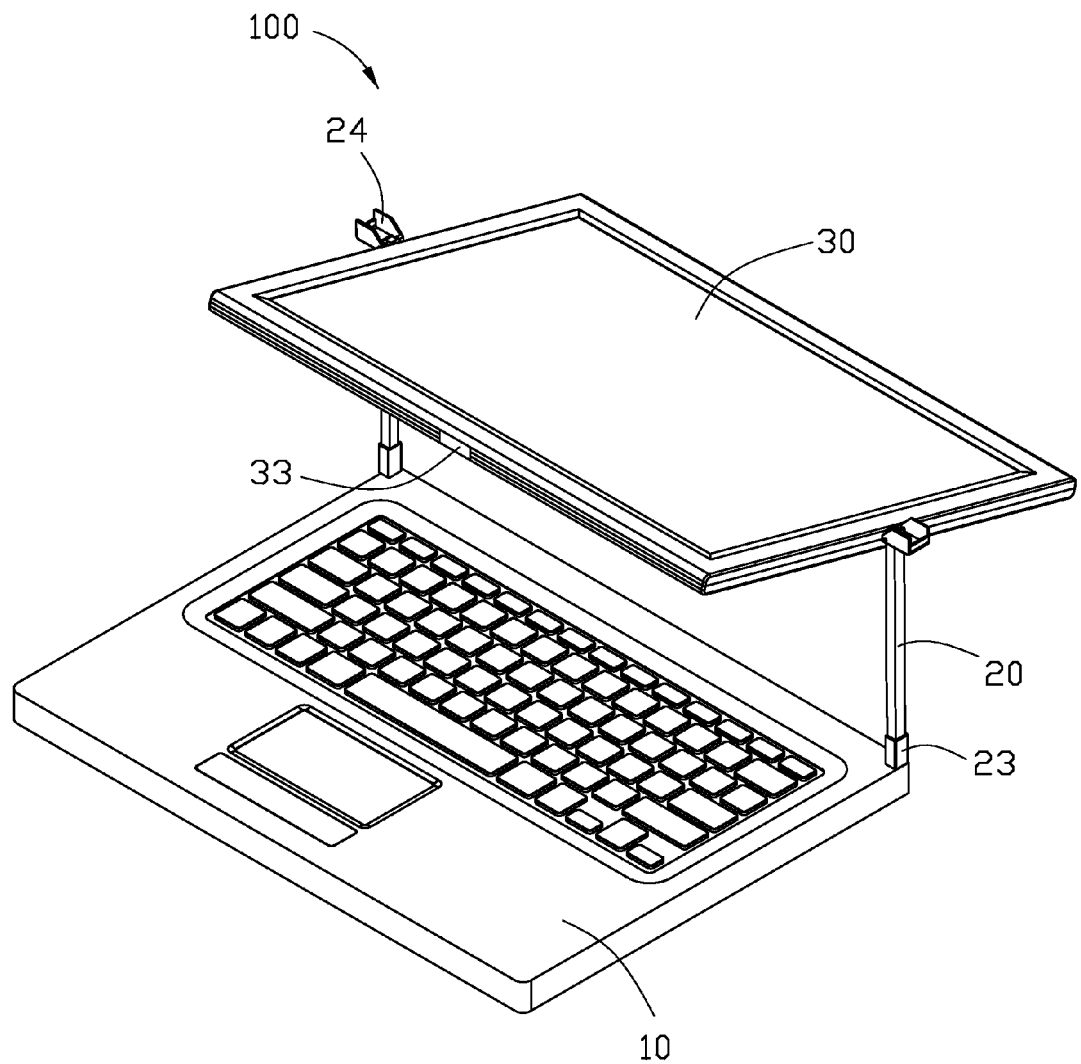
FIG. 5 is an isometric view of the notebook computer of which the display is about 180 degrees unfolded, according to the present disclosure.

Further referring to the FIG. 5, when a presenter wishes to show the screen 31 to an audience or adjust a perspective, the stop cover 24 is separated from the display 30 and the presenter rotates the stop cover 24 around the second shaft 25. Then the presenter can adjust the screen 31 to a desired angle. The position sensor 33 detects the orientation of the display 30. If the display 30 is turned over, the position sensor 33 generates a control signal. The notebook computer 100 orients the image according to the control signal.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. A notebook computer comprising:
   a main body comprising an upper surface and two first joint members disposed on two corners of the upper surface;

two connecting assemblies, each of the connecting assemblies comprising:
an arm; one end of the arm rotatably connected to a first joint member;
a connecting shaft perpendicularly connected to the arm, and adjacent to a distal end of the arm from the first joint member; and
a stop cover rotatably disposed on the distal end; and
a display defining a pair of axle holes at one sidewall; the display disposed between the two arms of the two connecting assemblies, each connecting shaft of each arm rotatably inserted in the axle hole.

2. The notebook computer in claim 1, wherein the connecting assemblies further comprise a stop sleeve, and the stop sleeve moveably sleeves onto the arm.

3. The notebook computer in claim 2, wherein each of the first joint members defines a first shaft hole.

4. The notebook computer in claim 3, wherein the arm comprises a pair of first side surfaces and a pair of second side surfaces; the arm defines a second shaft hole extending through the second side surfaces on one distal end, and the connecting shaft is disposed on the first side surface.

5. The notebook computer in claim 4, wherein the arm defines a receiving slot on the other distal end, forming two holding plates, and each holding plate defines a first sleeve hole.

6. The notebook computer in claim 5, wherein the stop cover comprises a base, a spacing plate and two side plates; the spacing plate extends uprightly from one edge of the base, the two opposite side plates extend uprightly from two edges of the base correspondingly, the spacing plate is disposed between the side plates, and each of side plates defines a second sleeve hole at one end away from the spacing plate.

7. The notebook computer in claim 6, wherein the connecting assembly further comprises a first shaft and a second shaft, the first shaft inserts through the first sleeve hole and the first shaft hole, and the second shaft inserts through the second sleeve hole and the second shaft hole.

8. The notebook computer in claim 1, wherein the arm is a hollow rectangular rod; and the connecting shaft is a hollow cylindrical rod.

9. A notebook computer comprising:
a main body comprising an upper surface and two first joint members disposed on two corners of the upper surface;
two connecting assemblies, each of the connecting assemblies comprising:
an arm; one end of the arm rotatably connected to a first joint member;
a connecting shaft perpendicularly connected to the arm, and adjacent to a distal end of the arm from the first joint member; and
a stop cover rotatably disposed on the distal end; and
a display defining a pair of axle holes at one sidewall, and comprising a position sensor configured to detect the orientation of the display; the display disposed between the two arms of the two connecting assemblies, each connecting shaft of each arm rotatably inserted in the axle hole.

* * * * *